(12) United States Patent
Moran et al.

(10) Patent No.: US 9,895,019 B2
(45) Date of Patent: Feb. 20, 2018

(54) DEVICE FOR USE IN THE PREPARATION OF BEVERAGES, FOR MANAGING THE DRAW-OFF OF WATER FROM A SOURCE OF HOT WATER

(71) Applicants: Sean Martin Moran, Dublin (IE); Paul Drewry Pearson, Letterkenny (IE); Paul Francis Stack, Dublin (IE)

(72) Inventors: Sean Martin Moran, Dublin (IE); Paul Drewry Pearson, Letterkenny (IE); Paul Francis Stack, Dublin (IE)

(*) Notice: Subject to any disclaimer, the term of this patent is extended or adjusted under 35 U.S.C. 154(b) by 393 days.

(21) Appl. No.: 14/439,123

(22) PCT Filed: Oct. 31, 2013

(86) PCT No.: PCT/EP2013/072824
§ 371 (c)(1),
(2) Date: Apr. 28, 2015

(87) PCT Pub. No.: WO2014/068064
PCT Pub. Date: May 8, 2014

(65) Prior Publication Data
US 2015/0305550 A1    Oct. 29, 2015

(30) Foreign Application Priority Data
Nov. 2, 2012 (IE) .................................. 2012/0477

(51) Int. Cl.
*A47J 31/46* (2006.01)
*F24D 17/00* (2006.01)
*A47J 27/21* (2006.01)

(52) U.S. Cl.
CPC ......... *A47J 31/465* (2013.01); *A47J 31/462* (2013.01); *F24D 17/0031* (2013.01);
(Continued)

(58) Field of Classification Search
CPC ....... Y10T 137/6579; Y10T 137/85954; Y10T 137/6416; Y10T 137/86308;
(Continued)

(56) References Cited

U.S. PATENT DOCUMENTS 3,392,266 A * 7/1968 Stahler .................... A47J 31/56
                                                          222/146.1
4,036,722 A * 7/1977 Brushwyler ........... G01N 27/28
                                                          204/408

(Continued)

FOREIGN PATENT DOCUMENTS

DE        20112265 U1    11/2001
GB        2377751 A      1/2003

OTHER PUBLICATIONS

International Search Report / PCT/EP2013/072824 / dated Mar. 13, 2014 / Date of Completion Mar. 6, 2014.

*Primary Examiner* — Atif Chaudry
(74) *Attorney, Agent, or Firm* — Fulwider Patton LLP

(57) ABSTRACT

A device for use in the preparation of beverages, for managing the draw-off of water from a source of hot water comprises a chamber having a base, a cylindrical wall mounted on the base and a top section. An inlet and a return outlet are mounted in the base, and both the inlet and the return outlet are connectable to a source of hot water. Three draw-off outlets are also mounted in the base. The return outlet consists of a hollow tube section, which passes through the base to form a stand pipe. In use, hot water is introduced into the chamber through inlet and the chamber is orientated such that return outlet is positioned above the inlet. The inlet flow rate is equal to or greater than the draw-off flow rate, and any excess volume of hot water in the chamber is returnable, to the source of hot water, through the return outlet, thereby creating a constant head of water above the draw-off outlets.

10 Claims, 5 Drawing Sheets

(52) U.S. Cl.
CPC .... *A47J 27/21166* (2013.01); *Y10T 137/6416* (2015.04); *Y10T 137/6579* (2015.04); *Y10T 137/85954* (2015.04); *Y10T 137/86308* (2015.04); *Y10T 137/86356* (2015.04)

(58) Field of Classification Search
CPC ......... Y10T 137/86356; A47J 27/21166; A47J 31/465; F24D 17/0031
See application file for complete search history.

(56) References Cited

U.S. PATENT DOCUMENTS

| | | | | |
|---|---|---|---|---|
| 4,728,408 | A * | 3/1988 | Palazzolo | C25C 7/00 204/228.2 |
| 4,784,051 | A * | 11/1988 | Hauslein | A47J 31/0573 99/299 |
| 5,203,367 | A * | 4/1993 | Akai | B65B 3/06 137/101.25 |
| 5,868,062 | A * | 2/1999 | Enomoto | A47J 31/002 99/282 |
| 2004/0249502 | A1* | 12/2004 | Truong | B60P 3/0257 700/232 |
| 2005/0053370 | A1* | 3/2005 | Morimoto | A47J 27/21008 392/441 |
| 2011/0033176 | A1* | 2/2011 | Garvey | A47J 27/21166 392/444 |
| 2011/0113970 | A1* | 5/2011 | Liu | A47J 31/465 99/300 |
| 2011/0252976 | A1* | 10/2011 | Liu | A47J 31/002 99/288 |

* cited by examiner

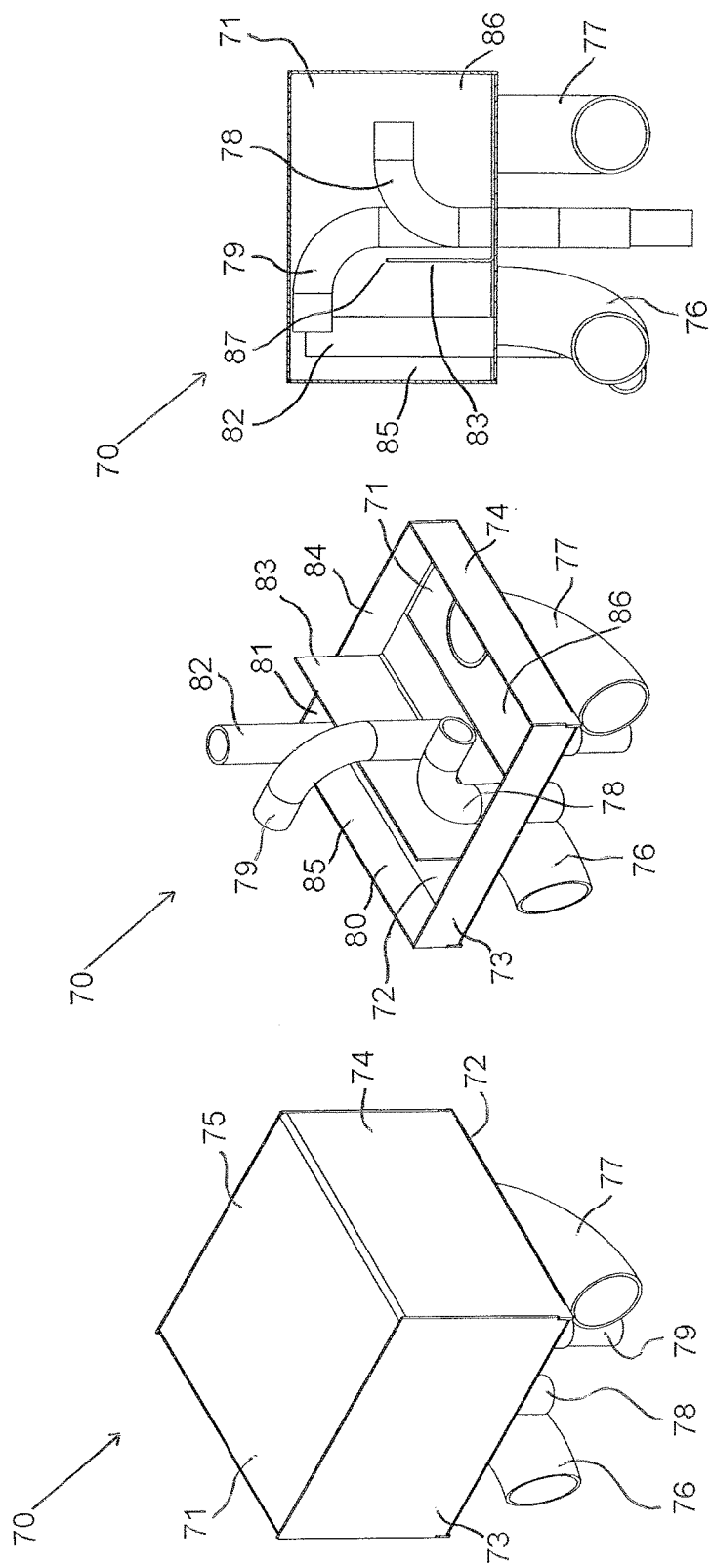

DEVICE FOR USE IN THE PREPARATION OF BEVERAGES, FOR MANAGING THE DRAW-OFF OF WATER FROM A SOURCE OF HOT WATER

CROSS-REFERENCE TO RELATED APPLICATIONS

This is a U.S. national phase application of PCT/EP2013/072824, filed Oct. 31, 2013, all of whose contents are hereby incorporated by reference.

TECHNICAL FIELD

This invention relates to a device for use in the preparation of beverages, for managing the draw-off of water from a source of hot water and, in particular, to a device for use in the preparation of beverages in the hospitality industry.

BACKGROUND

An atmospheric boiler is commonly used in the hospitality industry as a source of hot water for use in the preparation of beverages. An example of such a boiler is the Ecoboiler under-counter range of atmospheric boilers manufactured by Marco Beverage Systems Limited, 74 Heather Road, Sandyford Business Park, Dublin 18, Ireland. The boilers are designed to be located under a work surface in locations such as hotel and restaurant kitchens, coffee shops and canteens. The boilers come with single or dual dispense fonts and the larger models can accommodate up to three fonts from a single boiler. The hot water is pumped from the boiler for dispensing from the fonts.

However, a problem with such under-counter boilers is that the flow rate at a particular font can vary depending on the load on the boiler. This can result in a variation in the volume and temperature per unit time from a font, which can affect the quality of the resultant beverage.

It is an object of the present invention to overcome the disadvantages of the atmospheric boilers hereinbefore described.

SUMMARY OF THE INVENTION

Thus, the invention provides a device for use in the preparation of beverages, for managing the draw-off of water from a source of hot water, the device comprising a chamber having an inlet and a return outlet, both being connectable to the source of hot water, an air vent, and one or more draw-off outlets, such that, in use, the return outlet is positioned above the and each draw-off outlet, the inlet flow rate is equal to or greater than the draw-off flow rate, and any excess volume of water in the chamber is returnable to the source of hot water through the return outlet, thereby creating a constant head of water above the draw-off outlets.

An advantage of the device according to the invention is that once the device has been primed and water is being drawn off therefrom, any excess water in the chamber is returned to the source of hot water, which circulation of the water has the effect of maintaining the temperature of the water being drawn-off from the device. Thus, when a user wishes to draw-off some hot water it will only be necessary to dump a small quantity of cold water before the hot water supply kicks in.

Preferably, the return outlet is a stand pipe, which extends within the chamber to a distance which, in use, defines the head height of the water in the chamber.

An advantage of the stand pipe arrangement is that the head of water can be altered by changing the length of the stand pipe, without having to move the location of the return outlet in the chamber.

In one embodiment of the invention, the water is pumped to the inlet.

An advantage of this arrangement is that the source of hot water may be located below the device, e.g. the source of water could be located under a counter top on which the device is mounted. This results in space saving. In such arrangements, any excess water in the chamber will return to the source of hot water by gravity flow.

A further advantage of this arrangement is that the capacity of the pump can be matched to the maximum draw-off volume for a particular application.

In a further embodiment of the invention, the water is pumped from the return outlet.

An advantage of this arrangement is that the source of hot water may be located above the device, e.g. the source of water could be located above a counter top on which the device is mounted, out of sight of a customer. This results in space saving. In such arrangements, the hot water is fed to the device by gravity flow and any excess water in the chamber will return to the source of hot water by the action of the pump.

In a further embodiment of the invention, the chamber is mounted on an elongate base unit, which unit is fixable to a work surface, and wherein a flexible tube is connectable, at one end thereof, to a draw-off outlet, and the flexible tube having a dispensing unit mounted on the other end thereof.

An advantage of this arrangement is that a flexible tube can be attached to each draw-off outlet, allowing a number of individuals to use their own supply of hot water for the manual preparation of a beverage. This results in a saving of space.

In a further embodiment of the invention, a gravity flow, filtered coffee machine is connectable to a draw-off outlet.

An advantage of this arrangement is that the constant head of water in the chamber results in a constant flow rate of water to the coffee making machine, which in turn results in a consistent dispensed amount of hot water, which improves the consistency of the coffee being produced.

A further advantage of this arrangement is that a number of coffee machines can be connected through the device to a single source of hot water with the attendant energy costs and space savings.

A further advantage of this arrangement is that the coffee machines do not require their own tank of water and water heating system.

In a further embodiment of the invention, a dispensing font is connectable to a draw-off outlet.

An advantage of this arrangement is that hot water is dispensed at a constant flow rate resulting in a consistent dispense volume per dispense time period.

A further advantage of this arrangement is that, due to the circulation of hot water through the chamber, a higher dispense temperature can be achieved when compared to a font connected directly to a remote source of hot water.

In a further embodiment of the invention, the source of hot water is connectable to the device by a venting conduit, such that the source of hot water and the device are vented to the atmosphere through the air vent.

An advantage of this arrangement is that a coffee brewer incorporating the device according to the invention and including an atmospheric boiler as a source of hot water only requires one vent for venting to the atmosphere.

In a further embodiment of the invention, the source of hot water is a tank, within which the device is locatable, the hot water being pumped to the chamber inlet and the chamber being open at the top thereof to serve as the outlet such that, in use, any excess volume of water, pumped into the chamber, will overflow back into the tank.

An advantage of this arrangement is that the construction of the device is simplified in that the chamber is open ended and does not require the machining of a separate return outlet.

Preferably, the tank has an elongate extension thereto, which extension extends above the tank and in which extension the device is locatable near the end of the extension remote from the tank.

An advantage of this arrangement is that the positioning of the device above the tank increases the head of water for delivery therefrom.

Further, preferably, the chamber is not completely watertight such that, in use, when hot water is not being pumped into the chamber any remaining water therein will drain back into the tank.

An advantage of this arrangement is that the chamber will be primed with hot water when required and water, the temperature of which would gradually drop, when not being drawn off, will not remain in the chamber.

In another aspect of the invention there is provided a system, for use in the preparation of beverages, for managing the draw-off of water from a source of hot water, the system comprising a plurality of devices as hereinbefore described, with the inlet of each device being connectable to the source of hot water, and the return outlet of each device being connectable to the source of hot water.

An advantage of the system according to the invention is that as only one source of hot water is used, the saving in space and in equipment costs can be substantial, depending in the number of devices that are attached.

BRIEF DESCRIPTION OF THE DRAWINGS

The invention will be further illustrated by the following description of embodiments thereof, given by way of example only with reference to the accompanying drawings in which:

FIG. 7 is a perspective view of a further embodiment of the device in accordance with the invention;

FIG. 8 is a cutaway view of the embodiment of FIG. 7 with a side of the chamber removed;

FIG. 9 is a front elevation of the embodiment of FIG. 7 with the front wall of the chamber removed;

DETAILED DESCRIPTION OF THE PREFERRED EMBODIMENTS

Figure 1:
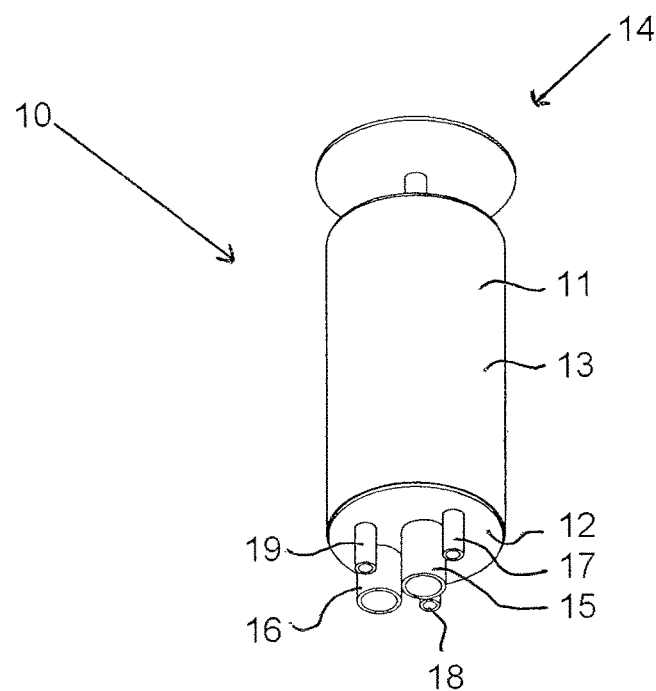
FIG. 1 is a perspective view of a device in accordance with the invention.

Referring to FIG. 1, there is illustrated generally at 10, a device for use in the preparation of beverages, for managing the draw-off of water from a source of hot water, in accordance with the invention. The device 10 comprises a chamber 11 having a base 12, a cylindrical wall 13 mounted on the base 12 and a top section illustrated generally at 14 and shown in more detail in FIGS. 2 and 3.

An inlet 15 and a return outlet 16 are mounted in the base 12, and both the inlet 15 and the return outlet 16 are connectable to a source of hot water. Three draw-off outlets 17, 18, 19 are also mounted in the base 12.

Figures 2, 3:
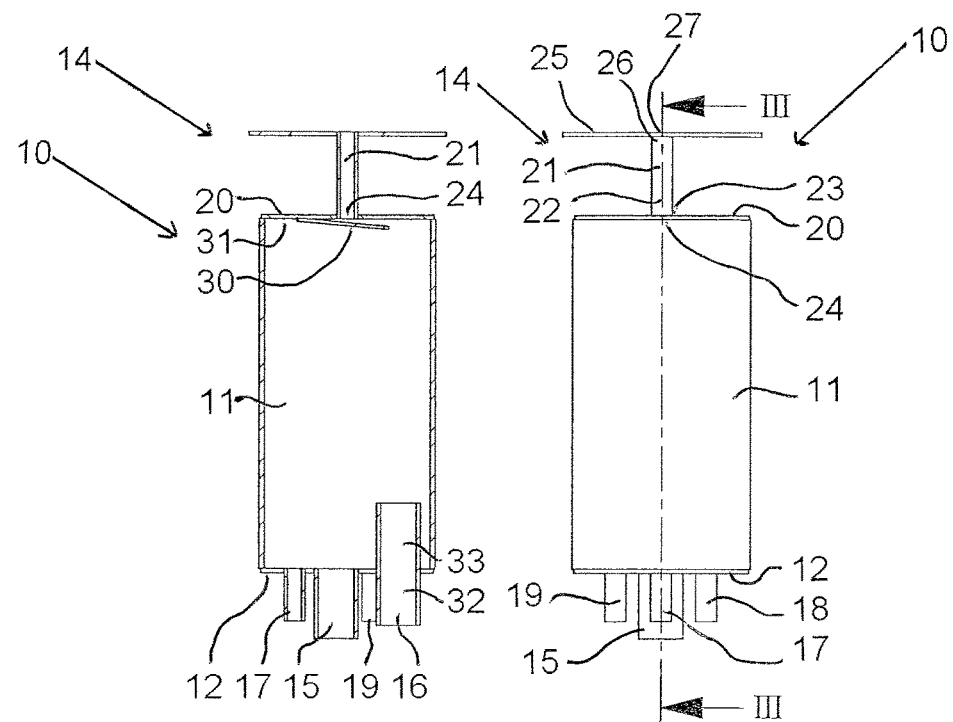
FIG. 2 is a front elevation of the device of FIG. 1.
FIG. 3 is a cross-section on the line III-III of FIG. 2.

Referring to FIG. 2, the top section 14 comprises a top closure piece 20 having a vent unit 21, consisting of a hollow tube 22 mounted at one end 23 thereof, over a central opening 24 in the top closure piece 20, and a cap 25 mounted on other end 26 of the hollow tube 22. The cap 25 has a central opening 27 therein over the tube 22 and thus, in use air can be vented through the tube 22 to the atmosphere.

Referring to FIG. 3, a splash guard 30 is mounted on inner surface 31 of the top closure piece 20, which splash guard 30 partially covers the central opening 24, such that, in use water is prevented from exiting through the vent 21.

The return outlet 16 consists of a hollow tube section 32, which passes through the base 12 to form a stand pipe 33.

Referring to FIGS. 1 to 3, in use, hot water is introduced into the chamber 11 through inlet 15 and the return outlet 16 is positioned above the inlet 15. The inlet flow rate is equal to or greater than the draw-off flow rate, and any excess volume of hot water in the chamber 11 is returnable, to the source of hot water, through the return outlet 16, thereby creating a constant head of water above the draw-off outlets 17, 18, 19.

Figure 4:
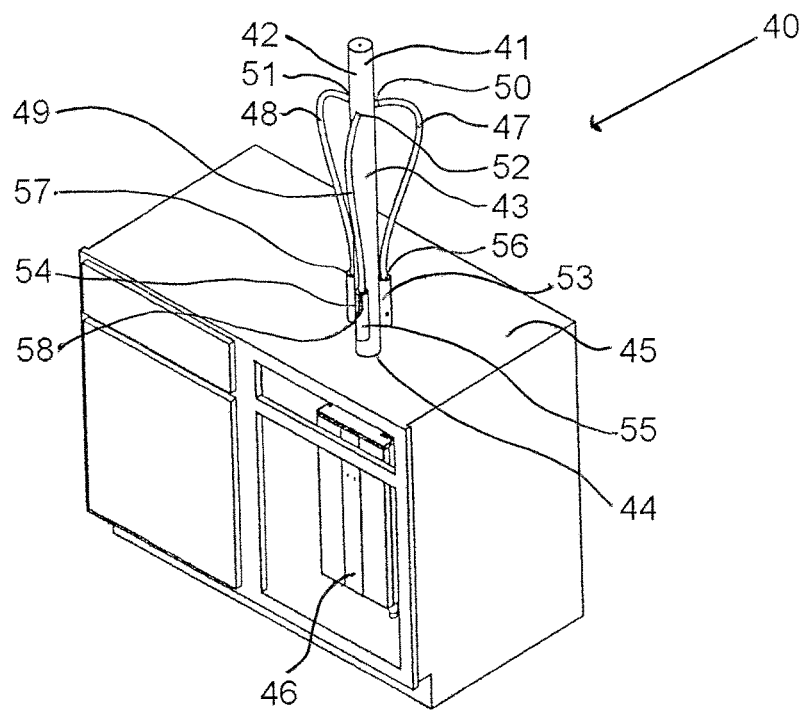
FIG. 4 is a perspective view of a further embodiment of the device in accordance with the invention.

Referring to FIG. 4, there is illustrated generally at 40, a further embodiment of the device in accordance with the invention. The device 40 comprises a chamber 41 (see FIG. 6. below for detail) mounted at one end 42 of an elongate base unit 43. The elongate base unit is fixed, at the other end 44 thereof, to a work surface 45. An atmospheric water boiler 46 is housed under the work surface 45, and two tubes (not shown) connect the chamber 41 to the atmospheric water boiler 46.

Three flexible tubes 47, 48, 49 are connected to the elongate base unit 43 at positions 50, 51, 52 respectively. A corresponding draw-off outlet (not shown) connects to each of the flexible tubes 47, 48, 49, each of which has a dispensing unit 53, 54, 55 mounted at its free end 56, 57, 58 respectively.

Figures 5, 6:
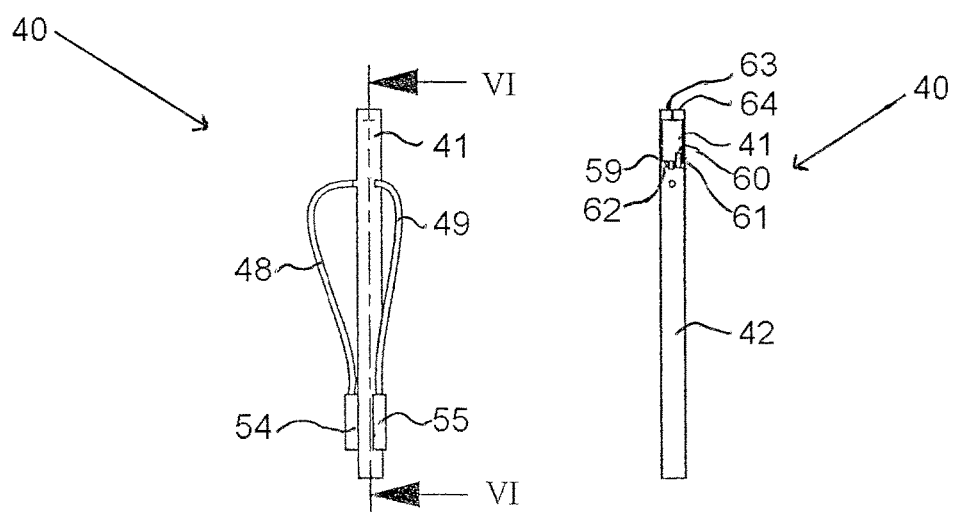
FIG. 5 is a front elevation of the elongate base unit of the device of FIG. 4.
FIG. 6 is a cross-section on the line VI-VI of FIG. 5.

Referring to FIG. 5, the device 40 is shown unattached to a work surface.

Referring to FIG. 6, which is a cross-section on line VI-VI of FIG. 5, the position of the chamber 41 in the elongate base unit 43 can be more clearly seen. The height difference between the base 59 of the chamber 41 and the top 60 of the return outlet 61 determines the head of water over the draw-off outlets 62.

An air vent 66 is centrally positioned in the top 64 of the chamber 41.

Referring to FIG. 7, there is illustrated generally at 70, a further embodiment of the device in accordance with the invention. The device 70 comprises a box-shaped chamber 71 having a base 72, upstanding side walls 73, 74 mounted thereon and a top section 75.

A draw-off outlet 76 and a return outlet 77 are mounted in the base 72. A chamber vent 78 exits the base 72 of the chamber 71, through which chamber vent 78 hot air from the chamber 71 is vented to the atmosphere. A tank vent 79 enters the chamber 71 through the base 72, through which tank vent 79 hot air from a source of hot water is vented to the chamber and thence to the atmosphere through the chamber vent 78.

Referring to FIG. 8, side walls 73, 74, and 80, 81 of the device 70 have been cut away for clarity. An inlet 82 extends within the chamber 71 from the base 72. A dividing wall 83 separates lower section 84 of the chamber 71 into a water delivery compartment 85 and an overflow return compartment 86.

Referring to FIG. 9, side 73 has been removed for clarity. In use, hot water, when required, is pumped from the source of hot water (not shown) through the inlet 82 and the water delivery compartment 85 is filed. Once the water level reaches top 87 of the dividing wall 83 it will overflow into the return compartment 86, from which it returns to the source of hot water, through the return outlet 77.

Hot water is drawn-off from the device through the draw-off outlet 76. The device 70 is set up such that the rate of delivery of hot water from the source of hot water is greater than the rate of delivery from the draw-off outlet 76, resulting in a constant head of water in the delivery compartment 85.

Device 70 is designed to be positioned above the sprayhead of a coffee brewer and the tank vent 79 acts as a fixing point for the device 70.

Figure 10:
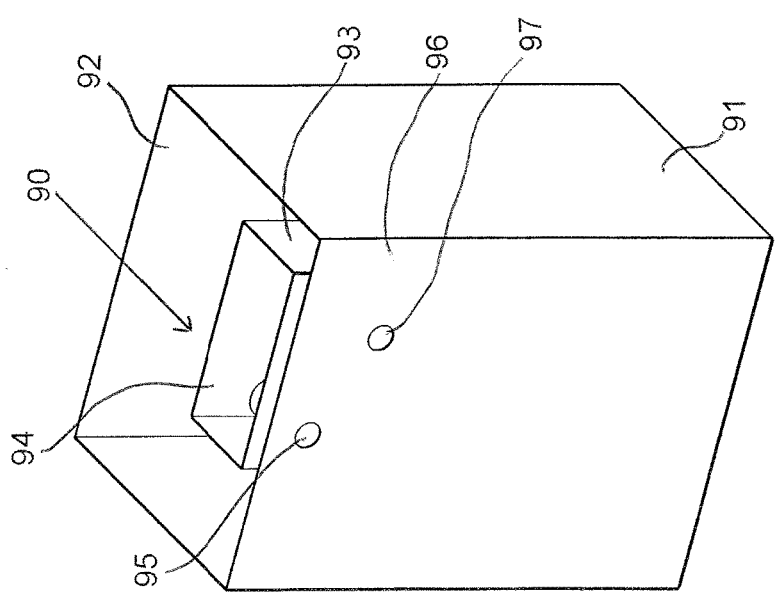
FIG. 10 is a perspective view of a further embodiment of the device in accordance with the invention.

Referring to FIG. 10, there is illustrated generally at 90, a further embodiment of the device in accordance with the invention. In this embodiment the device 90 is located within a source of hot water, in the form of a tank 91, at the upper end 92 thereof. Device 90 comprises a chamber 93 with an open top section 94.

An inlet 95 passes through a side wall 96 of the tank 91 into the chamber 93. A draw-off outlet 97 exits the chamber 93 and passes through the side wall 96 of the tank 91.

Figure 11:
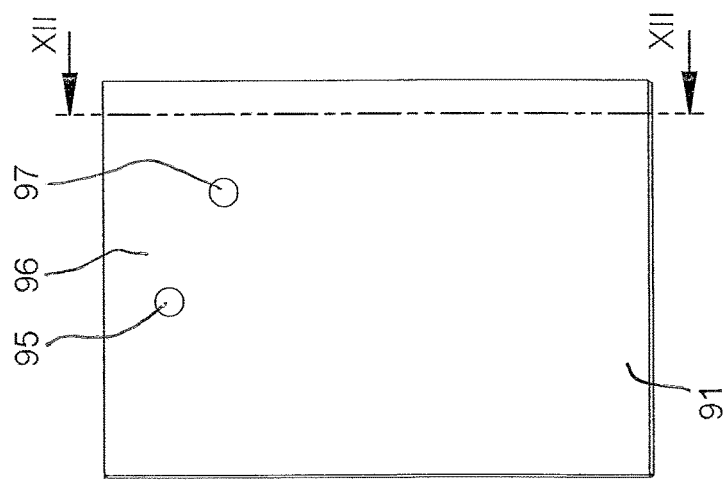
FIG. 11 is a side view of the embodiment of FIG. 10.

Referring to FIG. 11, a side view of the embodiment of FIG. 10 is illustrated. The inlet 95 is positioned above the draw-off outlet 97 in the side wall 96.

Figure 12:
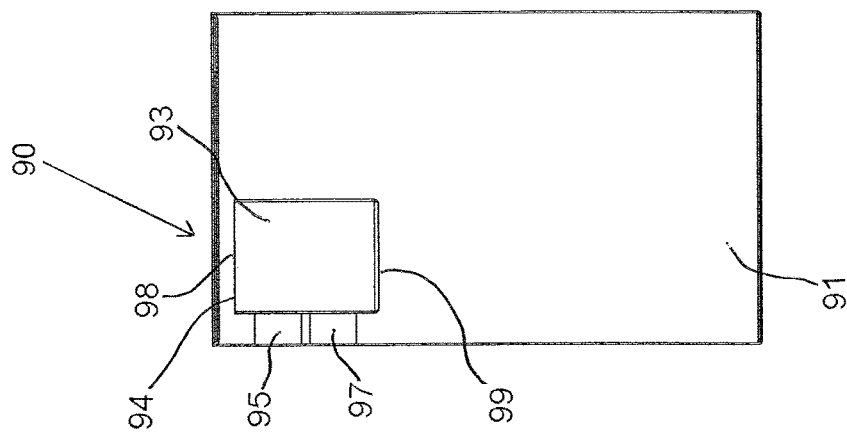
FIG. 12 is a cross-section on the line XII-XII of FIG. 11.

Referring to FIG. 12, the position of the chamber 93 within the tank 91 can be seen more clearly.

In use, the chamber 93 is filled with hot water through the inlet 95. When the water reaches the open top section 94, the water overflows from the chamber 93 and returns to the tank 91. Thus, the open top section 94 is acting as a return outlet 95 for the device 90.

Base 99 of the chamber 93 is water permeable, such that when the device 90 is not being used the water therein gradually leaks back into the tank 91.

Figure 13:
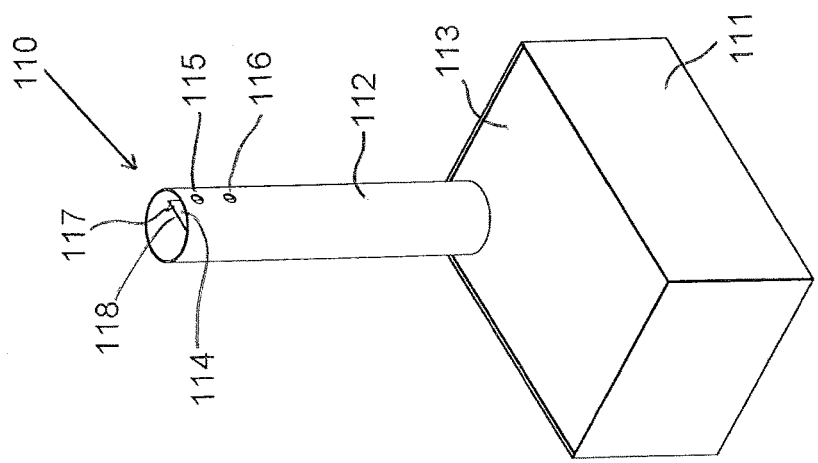
FIG. 13 is a perspective view of a further embodiment of the device in accordance with the invention.

Referring to FIG. 13, there is illustrated generally at 110, a further embodiment of the device in accordance with the invention. A source of hot water in the form of a tank 111 has an elongate extension 112 extending from top section 113 of the tank 111.

The device 110 is located at the end of the elongate extension 112. Device 110 comprises a chamber 114 having an inlet 115 and a draw-off outlet 116. Top section 117 of the chamber 114 is open and acts as a return outlet 118 for the chamber 114.

Figure 14:
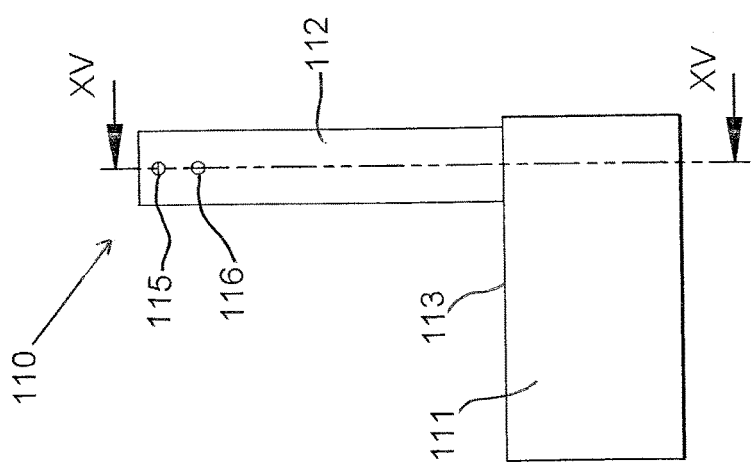
FIG. 14 is a side view of the embodiment of FIG. 13.

Referring to FIG. 14 the device 110 and the tank 111 are illustrated from one side.

Figure 15:
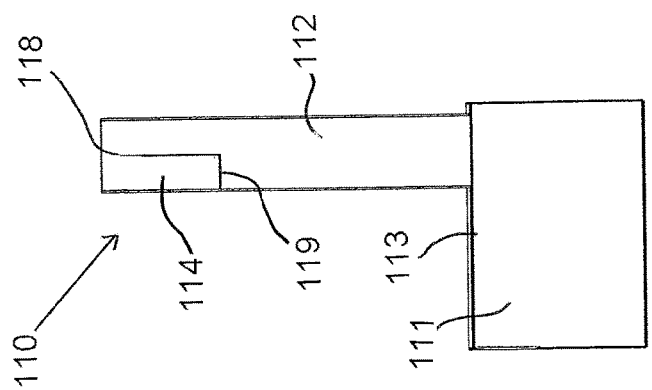
FIG. 15 is a cross-section on the line XV-XV of FIG. 14

Referring to FIG. 15, which is a cross-section on line XV-XV of FIG. 14, the location of the chamber 114 in the elongate extension 112 can be seen more clearly. The extension 112 is hollow and is in communication with the tank 111.

Referring to FIGS. 13, 14 and 15, hot water is pumped from the tank 111 to the chamber 114 through the inlet 115 (connecting plumbing not shown). Once the chamber 114 is full any excess water will overflow through the open return outlet 118 and will return to the tank 111 through the elongate extension 112. Hot water is draw-off through the draw-off outlet 116.

Base 119 of the chamber 114 is water permeable, such that when the device 1100 is not being used the water therein gradually leaks back into the tank 111.

We claim:

1. A device for use in the preparation of beverages, for managing the draw-off of water from a source of hot water, the device comprising a chamber having an inlet and a return outlet, both being connectable to the source of hot water, an air vent, and one or more draw-off outlets, such that, in use, the return outlet is positioned above the and each draw-off outlet, the inlet flow rate is equal to or greater than the draw-off flow rate, and any excess volume of water in the chamber is returnable to the source of hot water through the return outlet, thereby creating a constant head of water above the draw-off outlets;
    wherein the source of hot water is connectable to the device by a venting conduit, such that the source of hot water and the device are vented to the atmosphere through the air vent.

2. A device according to claim 1, wherein the return outlet is a stand pipe, which extends within the chamber to a distance which, in use, defines the head height of the water in the chamber.

3. A device according to claim 1, wherein the water is pumped to the inlet.

4. A device according to claim 1, wherein the water is pumped from the return outlet.

5. A device according to claim 1, wherein the chamber is mounted on an elongate base unit, which unit is fixable to a work surface, and wherein a flexible tube is connectable, at one end thereof, to a draw-off outlet one or more draw-off outlets, and the flexible tube having a dispensing unit mounted on the other end thereof.

6. A device according to claim 1, wherein a gravity flow, filtered coffee machine is connectable to a draw-off outlet one or more draw-off outlets.

7. A device according to claim 1, wherein a dispensing font is connectable to a draw-off outlet one or more draw-off outlets.

8. A device for use in the preparation of beverages, for managing the draw-off of water from a source of hot water, the device comprising a chamber having an inlet and a return outlet, both being connectable to the source of hot water, an air vent, and one or more draw-off outlets, such that, in use, the return outlet is positioned above the and each draw-off outlet, the inlet flow rate is equal to or greater than the draw-off flow rate, and any excess volume of water in the chamber is returnable to the source of hot water through the return outlet, thereby creating a constant head of water above the draw-off outlets;
    wherein the source of hot water is a tank, within which the device is locatable, the hot water being pumped to the chamber inlet and the chamber being open at the top thereof to serve as the return outlet such that, in use, any excess volume of water, pumped into the chamber, will overflow back into the tank.

9. A device according to claim 8, wherein the tank has an elongate extension thereto, which extension extends above the tank and in which extension the device is locatable near the end of the extension remote from the tank.

10. A device according to claim 8, wherein the chamber is not completely watertight such that, in use, when hot water is not being pumped into the chamber any remaining water therein will drain back into the tank.

\* \* \* \* \*